United States Patent
Cooper et al.

(10) Patent No.: US 6,620,791 B1
(45) Date of Patent: Sep. 16, 2003

(54) EDIBLE COMPOSITIONS CONTAINING TREHALOSE

(75) Inventors: Julian Michael Cooper, Norfolk (GB); Wei Tian, Norfolk (GB)

(73) Assignee: British Sugar PLC (GB)

( * ) Notice: Subject to any disclaimer, the term of this patent is extended or adjusted under 35 U.S.C. 154(b) by 0 days.

(21) Appl. No.: 10/048,049

(22) PCT Filed: May 18, 2000

(86) PCT No.: PCT/GB00/01914

§ 371 (c)(1),
(2), (4) Date: Apr. 16, 2002

(87) PCT Pub. No.: WO00/70966

PCT Pub. Date: Nov. 30, 2000

(30) Foreign Application Priority Data

May 20, 1999 (GB) ................................................ 9911783

(51) Int. Cl.⁷ ...................... A61K 31/70; A61K 31/715; A61K 9/20; C07H 1/00; A23G 31/00
(52) U.S. Cl. ......................... 514/23; 514/53; 536/1.11; 536/123.13; 424/439; 424/440; 424/441; 424/464; 424/465; 426/416; 426/658
(58) Field of Search ................. 514/23, 53; 536/123.13, 536/1.11; 424/439, 440, 441, 464, 465; 426/658, 416

(56) References Cited

U.S. PATENT DOCUMENTS 5,693,788 A * 12/1997 Mandai et al. ......... 536/123.13

FOREIGN PATENT DOCUMENTS

| EP | 0 600 730 A1 | 6/1994 |
|---|---|---|
| EP | 0 622 025 | 11/1994 |
| EP | 0 690 130 A1 | 1/1996 |
| EP | 0 693 558 A1 | 1/1996 |
| GB | 2 187 191 A | 9/1987 |
| GB | 2 206 273 A | 1/1989 |
| JP | 5 207223 | 8/1993 |
| JP | 6319503 | 11/1994 |
| JP | 9107911 | 4/1997 |
| JP | 09-163943 A2 * | 6/1997 |
| WO | WO 93/15234 | 8/1993 |
| WO | WO 97/28789 | 8/1997 |

OTHER PUBLICATIONS

CAPLUS Abstract 1997:442929 for JP–09–163943–A2, Jun. 24, 1997.*
Derwent Abstract 1997–380141 for JP–09–163943–A2, Jun. 24, 1997.*
Totsuka, et al., "Preparation of powder's from trehalose syrups", XP–002145654 & JP 11 140094 A, 1999, 1 page abstract, Derwent–acc–no. 1999–367087.

* cited by examiner

Primary Examiner—Kathleen K. Fonda
(74) Attorney, Agent, or Firm—Woodcock Washburn LLP

(57) ABSTRACT

The invention provides edible compositions such as solid particulate sweeteners, boiled sweets, chocolate and chewing gum, wherein the compositions comprise at least 10% on a dry weight basis of one or more substances having an endothermic heat of solution of at least −30 kJ/kg and at least 10% on a dry weight basis of a substantially amorphous solid trehalose. The one or more substances having an endothermic heat of solution may comprise dextrose monohydrate or a crystalline sugar alcohol. The invention also provides processes suitable for the production of such edible compositions, wherein the processes comprise the step of dry mixing amorphous trehalose particles in an amount of at least 10% based on the dry weight of the composition with one or more other edible ingredients to form a dry mixture.

33 Claims, 2 Drawing Sheets

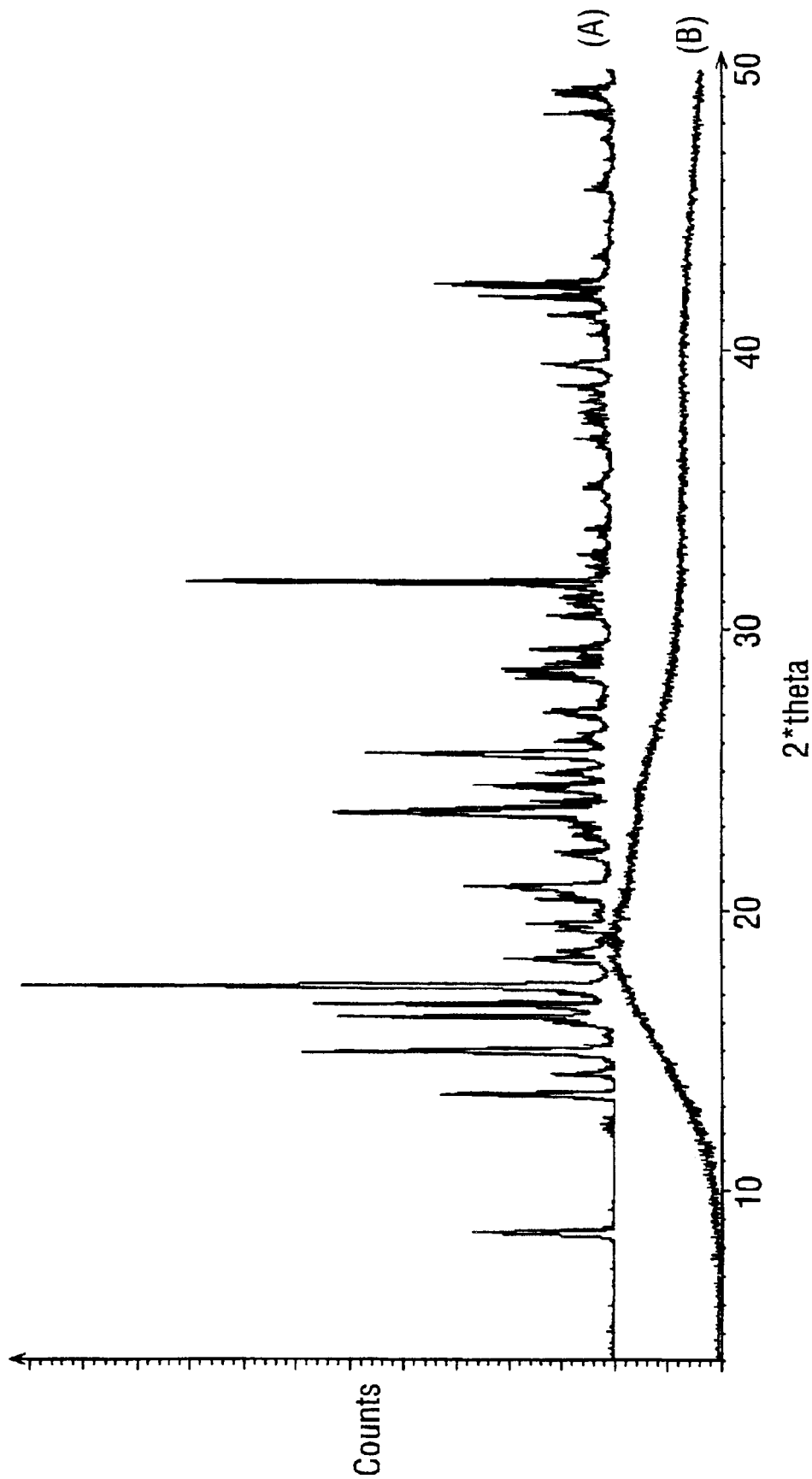

EDIBLE COMPOSITIONS CONTAINING TREHALOSE

Figure 1:
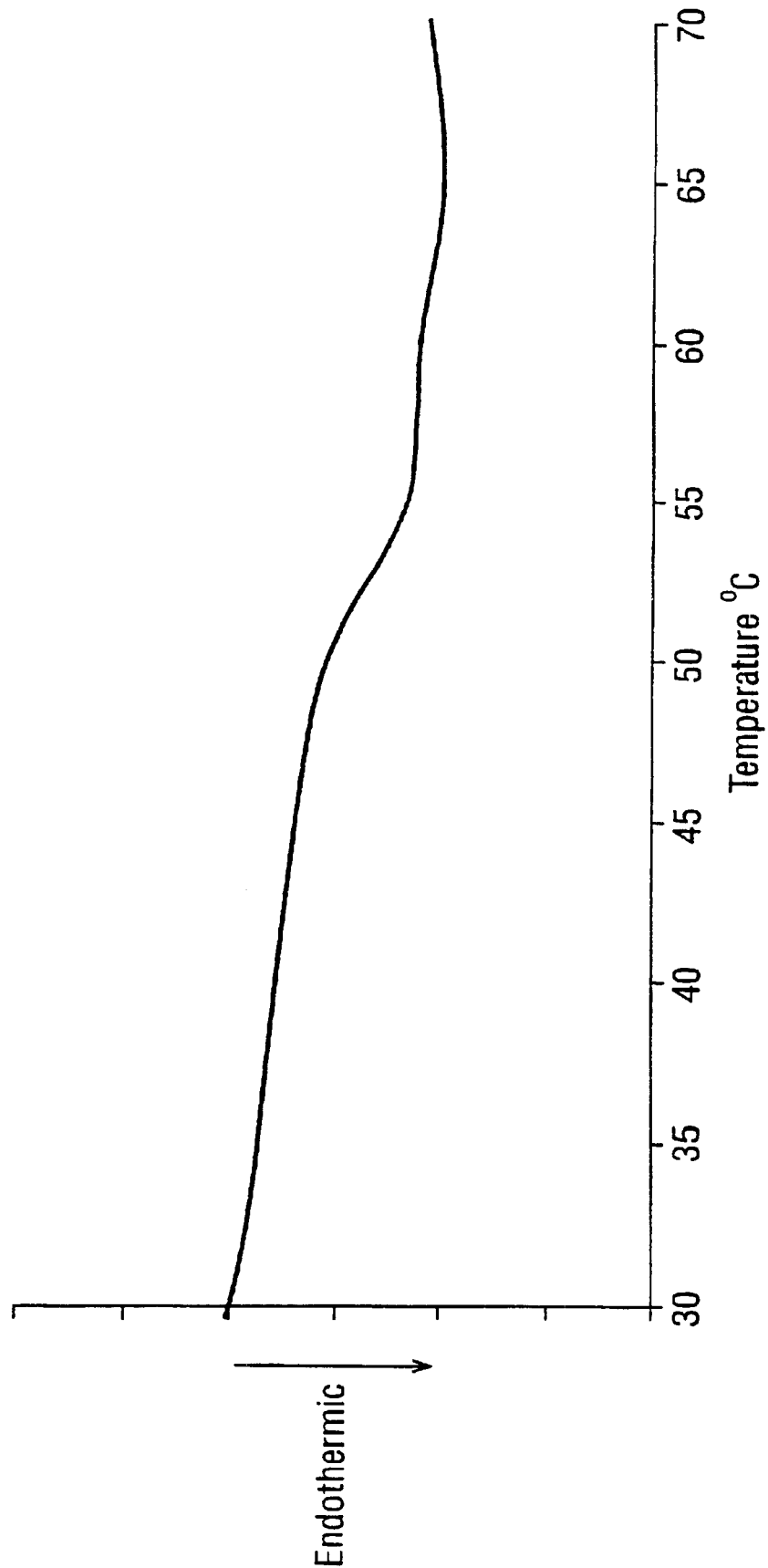

This is the U.S. National stage entry under 35 U.S.C. 371 of PCT/GB00/01914, filed May 18, 2000.

The present invention relates to edible compositions containing amorphous solid trehalose. The present invention also relates to methods of manufacture of compositions containing amorphous solid trehalose.

It is known to use sugar alcohols such as mannitol, sorbitol, xylitol, maltitol, isomalt, lactitol and erythirtol as non-cariogenic sweeteners in products such as boiled sweets, candy, chocolate and chewing gum. It is also known to use the sugar alcohols as excipients in the manufacture of medicaments for oral administration such as compressed tablets and lozenges to be sucked or chewed in the mouth. The drawback of such sweeteners is that they possess strongly endothermic heats of solution in the crystalline state, ranging typically from −39 kJ/kg for isomalt to −111 kJ/kg for sorbitol and −185 kJ/kg for crystalline erythritol (values are taken from the LFRA Ingredients Handbook— Sweeteners, J. M. Dalzell Ed., December 1996). Some sugars are also known to have strongly negative heats of solution. For example, dextrose monohydrate has a heat of solution of −105 kJ/kg.

Edible products or pharmaceuticals for oral administration containing ingredients with strongly negative heats of solution can give rise to a noticeable cooling in the mouth when the products are consumed. This cooling sensation is quite acceptable when the product contains menthol flavours such as mint, but it is undesirable when the product is non-menthol flavoured or the product is, for example, chocolate.

Trehalose is a naturally occurring non-reducing disaccharide. Specifically, trehalose is α-D-glucopyranosyl-α-D-glucopyranoside. It is present in certain drought-resistant plants such as *Selaginella lepidophylia*, and can also be prepared by fermentation. One suitable fermentation process is described in EP-A0693558.

GB-A-2206273 and GB-A-2187191 describe the use of trehalose as an additive to stabilize proteins and foodstuffs against degradation upon drying.

JP-A-60319503 describes the use of trehalose as a cryoproctectant for freeze-dried food. Up to 70% of trehalose on a dry weight basis is added to the food before freeze drying.

EP-A-0622025 describes the use of crystalline trehalose for the formulation of food products having reduced cariogenicity and calorie content compared to sucrose-containing sweeteners.

JP-A-92038642 describes confectionery compositions having low cariogenicity comprising trehalose and a sugar alcohol selected from erythritol, xylitol, mannitol, sorbitol, xylobiotol, maltitol and lactitol. These compositions apparently contain crystalline trehalose, probably trehalose dihydrate.

Crystalline trehalose dihydrate of the kind commercially available up until now has been measured by the present inventors to have a heat of solution of −52 kJ/kg. The present inventors have also found, surprisingly, that the heat of solution of amorphous trehalose formed by spray drying or melt spinning is actually positive, in the range 66–70 kJ/kg.

It is an object of the present invention to use the surprisingly exothermic heat of solution of amorphous trehalose to counteract the cooling effect in the mouth of food and pharmaceutical ingredients having endothermic heat of solution.

It is a further object of the present invention to use the surprisingly exothermic heat of solution of amorphous trehalose to provide novel processes for the production of foodstuffs and medicaments having a warming effect in the mouth.

Accordingly, the present invention provides an edible composition comprising at least 10% on a dry weight basis of one or more substances having an endothermic heat of solution of at least −30 kJ/kg and at least 10% on a dry weight basis of a substantially amorphous solid trehalose.

The term "substance having an endothermic heat of solution" refers to food- or pharmaceutically-acceptable substances that are soluble in water under physiological conditions and have an endothermic heat of solution of at least (i.e. at least as endothermic as) −30 kJ/kg The substances having an endothermic heat of solution may for example be selected from the group consisting of soluble pharmaceuticals, pharmaceutically acceptable excipients, foodstuffs, flavorings, dietary supplements, or mixtures of such substances having negative heats of solution. Preferably, at least one of the substances having an endothermic heat of solution is a sweetener. For example, the substances may comprise dextrose monohydrate or even crystalline trehalose dihydrate. More preferably, the susbstances comprises a sugar alcohol. The term sugar alcohol refers to a hydrogenation product of a sugar. During hydrogenation, the aldehyde or ketone groups of the sugars are reduced to hydroxy groups. More preferably, the sugar alcohol is selected from the group consisting of mannitol, sorbitol, xylitol, maltitol, isomalt, lactitol, erythritol, and mixtures thereof.

Preferably, at least one of the substances having an endothermic heat of solution is substantially crystalline. Preferably, the substances having an endothermic heat of solution are soluble in water at 25° C. to the extent of at least 25 g/liter, more preferably at least 100 g/liter. Preferably, at least one of the substances having an endothermic heat of solution is substantially anhydrous in the products according to the invention except for water of crystallisation, if any.

In any case, the one or more substances having an endothermic heat of solution exhibit a heat of solution equal to or more endothermic than −30 kJ/kg, more preferably more endothermic than −50 kJ/kg, and most preferably more endothermic than −70 kJ/kg.

Preferably, the edible composition according to the present invention comprises at least 20% by weight, of the substances having heats of solution equal to or more endothermic than −30 kJ/kg. Preferably, the edible composition according to the present invention comprises at least 20% by weight of amorphous trehalose. The edible compositions may, of course, comprise other edible or pharmaceutical components that do not contribute substantially to the heat of solution.

The solid trehalose is substantially amorphous. That is to say, it is characterized by a diffuse X-ray diffraction patter, as shown in FIG. 2. Amorphous trehalose can also be distinguished from crystalline trehalose by differential scanning calorimetry (DSC), Fourier transform infrared spectroscopy (FTIR), solid state nuclear magnetic resonance spectroscopy (NMR), microscopic techniques and other techniques.

Amorphous solid trehalose can be made by freeze-drying, spray drying, vacuum drying or over, drying aqueous solutions of trehalose. Amorphous trehalose can also be formed by melt spinning of solid trehalose in a candy floss-type machine. Preferably, the substantially amorphous solid trehalose has a heat of solution in water at 25° C. of at least 30 kJ/kg, more preferably at least 60 kJ/kg. The latter value corresponds to substantially amorphous and anhydrous trehalose.

Preferably, the edible composition comprises less than 20% by weight of water, more preferably less than 10% by weight of water, and still more preferably less than 5% by weight of water. Higher water contents would cause the amorphous trehalose to revert to a crystalline form, or even to dissolve thereby making the heat of solution irrelevant to the sensation of the composition in a consumer's mouth Preferably, the weight ratio of the substance having an endothermic heat of solution to substantially amorphous solid trehalose is selected to modify the sensation of heating or cooling in the mouth when the edible composition is consumed. In practice, the weight ratio of substance having an endothermic heat of solution to trehalose is preferably in the range of 1:10 to 3:1, more preferably from 1:4 to 1:1. Preferably, the ratio of substance having an endothermic heat of solution to trehalose is selected such that the heat of solution of the edible composition is greater than (i.e. less endothermic than) −50 kJ/kg, more preferably greater than −30 kJ/kg, still more preferably greater than −15 kJ/kg, and most preferably greater than −5 kJ/kg.

The present invention is especially suitable for edible compositions in which the substances having an endothermic heat of solution and the trehalose together make up a substantial fraction of the composition. Preferably, they together make up at least 25%, more preferably at least 50% and still more preferably at least 75%, at least 90% or at least 95% by weight of the composition.

More preferably, the composition consists essentially of sugar alcohols and/or sugars having an endothermic heat of solution and the amorphous trehalose, for example when the composition is a sweetener composition. More preferably, the sweetener composition is a free-flowing, particulate sweetener composition.

Other preferred edible compositions include chocolate, compressed tablets and hard sweets that are sucked in the mouth, and chewing gum. The edible compositions of this invention may form part of a larger foodstuff, for example the compositions may be present as a coating on an edible core. The edible compositions according to the present invention are also less calorific and less cariogenic than compositions having equivalent organoleptic properties made with conventional sugars such as sucrose.

In a further aspect, the present invention provides a method of manufacturing an edible composition comprising the step of dry mixing amorphous trehalose particles in an amount of at least 10% based on the dry weight of the composition with one or more other edible ingredients to form a dry mixture.

Preferably, the amorphous trehalose as hereinbefore defined is dry mixed in an amount of at least 20% by weight, more preferably at least 30% by weight based on the dry weight of the composition. The term "dry mixing" refers to mixing the particles substantially in the absence of water, preferably in the presence of less than 20% by weight of water, more preferably less than 10% by weight of water and most preferably less than 5% by weight of water. Preferably, the water content does not exceed these levels at any stage in the process after addition of the dry mixing step. This contrasts with the prior use of trehalose as a cryoprotectant in foodstuffs, where the trehalose is mixed with the aqueous foodstuff prior to freeze drying.

Preferably, the particle size of the trehalose used in the methods of this invention is less than 1 mm, preferably less than 0.1 mm, in order to achieve the desired intimate mixing.

The dry mixture preferably undergoes further processing steps, such as compressing the dry mixture to form a tablet, or forming the mixture Into a coating. In other preferred embodiments, the mixture further comprises a fat, and the method further comprises melting the fat In the dry mixture to form a fluid dry mixture, such as melted chocolate. Preferably, the dry mixture has substantially the same composition as the edible composition produced by the process.

The processes according to the present invention can be used to make compositions according to the present invention as hereinbefore described. The processes can also be used to make edible compositions containing little or no substances having endothermic heats of solution, in which case the edible compositions containing amorphous trehalose have a net exothermic heat of solution that gives the compositions a warming effect in the mouth when they are consumed. In these embodiments, the dry mixture in the process according to the present invention has an exothermic heat of solution in water at 25° C. of at least +15 kJ/kg, more preferably at least +30 kJ/kg.

Preferably, the edible composition is selected from the group consisting of chocolate, compressed tablets, hard sweets that are sucked in the mouth, and chewing gum.

Specific embodiments of the present invention will now be described further, by way of example, with reference to the accompanying drawings, in which:

FIG. 1 shows a DSC thermogram of an amorphous trehalose made in accordance with Procedure 1(a); and FIG. 2 shows X-ray diffractograms of powdered, crystalline trehalose dihydrate (plot A for comparison) and amorphous trehalose (plot B) prepared in accordance with procedure 1(a).

PROCEDURE 1

Amorphous trehalose was prepared by the following methods:

(a) Spray Drying

Trehalose dihydrate supplied by Hayashibara Company and thought to have been manufactured in accordance with the method of EP-A-0693558 was dissolved in demineralised water to give a 40% trehalose solution at 40° C. The solution was spray dried using a Niro Minor spray drier at an inlet temperature of 21.5° C. and an outlet temperature of 115° C. The moisture content of the product was 2% as measured by Karl-Fisher titration. FIG. 1 shows a DSC thermogram of the spray-dried trehalose. FIG. 2 shows X-ray diffractograms of powdered, crystalline trehalose dihydrate (for comparison) and the spray-dried trehalose. The diffuse diffractogram confirms that the spray-dried trehalose is substantially in the glassy state.

(b) Freeze Drying

Trehalose dihydrate was dissolved in demineralised water to give a 20% trehalose solution. The solution was frozen to −40° C., then freeze dried in an Edwards freeze dryer. A powdered material typical of freeze dried powder was obtained. The material was confirmed to be completely amorphous by DSC and X-ray powder diffraction.

(c) Melt Spinning

The spray dried trehalose obtained in procedure (a) was spun at high temperature using a candy floss type machine (Tornado Floss Machine) and filaments of glassy trehalose were obtained.

(d) Quench Melting

Crystalline trehalose dihydrate was heated with a minimal amount of water on a hot plate for a few minutes until an isotropic melt was obtained. The melt was then rapidly cooled to room temperature to produce a clear glass.

(e) Vacuum Drying

Glassy trehalose was prepared by vacuum drying trehalose dihydrate at 65° C. for 96 hours.

(f) Oven Drying

Glassy trehalose was prepared by heating trehalose dihydrate to 240° C. in an oven.

EXAMPLE 1

Edible sugar compositions according to the present invention were prepared by mixing spray dried trehalose prepared by Procedure 1(a) above with anhydrous crystalline xylitol (supplied by Xyrofin) in the following proportions. The temperature changes of a 4.8% solution (based on dry substance) were recorded upon dissolution:

| % Spray Dried Trehalose | Temperature Changes (° C.) |
| --- | --- |
| 0 | −1.7 |
| 25% | −1.0 |
| 50% | −0.4 |
| 75% | +0.3 |
| 100% | +0.8 |

These results demonstrate how the addition of spray dried trehalose counteracts the cooling effect of the dissolution of xylitol in water. Furthermore, the trehalose is sweet tasting with low cariogenicity.

EXAMPLE 2

An edible sugar composition consisting essentially of crystalline erythritol and amorphous trehalose was prepared as follows.

Spray dried trehalose prepared by Procedure 1(a) was blended with anhydrous crystalline erythritol (supplied by Cerestar) and the temperature changes of a 4.8% solution (based on dry substance) were recorded upon dissolution:

| % Spray Dried Trehalose | Temperate Changes (° C.) |
| --- | --- |
| 0 | −2.1 |
| 25% | −1.4 |
| 50% | −0.7 |
| 75% | +0.1 |
| 100% | +0.8 |

EXAMPLE 3

An edible candy floss composition was prepared by spinning a mixture of crystalline xylitol (30% by weight) and spray dried trehalose from procedure (a) above (70% by weight) in a Tornado Floss Machine. The candy floss was dissolved in an amount of 4.8% in water based on dry substance, and a temperature increase of 0.4° C. was recorded.

EXAMPLE 4

Two edible chocolate compositions according to the present invention and a comparative control chocolate composition were prepared according to the following recipes:

| Ingredient | Control | Sample 1 | Sample 2 |
| --- | --- | --- | --- |
| Crystalline Xylitol | 46.99 | 27.99 | 14.00 |
| Amorphous Trehalose | 0.00 | 18.99 | 32.99 |
| Full Cream Milk Powder | 20.49 | 20.49 | 20.49 |
| Cocoa Mass | 12.50 | 12.50 | 12.50 |
| Cocoa Butter | 17.50 | 17.50 | 17.50 |
| Butter Oil | 2.00 | 2.00 | 2.00 |
| Lecithin (Topcithin* 200) | 0.50 | 0.50 | 0.50 |
| Vanillin Crystals | 0.30 | 0.30 | 0.30 |
|  | 100% | 100% | 100% |

*Registered Trade Mark

The procedure was as follows:
1) A Hobart mixer was used to blend the molten fat with the dry ingredients to produce a refined paste;
2) The paste was refined with a chocolate roller refiner at 25–30° C. to produce thin flakes;
3) Conching of these flakes took place at a product temperature of 58° C. for 4 hours;
4) Lecithin was added;
5) The chocolate mass was then tempered at 50° C.
6) The tempered chocolate mass was moulded and stored in a refrigerator for 45 mins;
7) The chocolate bars were individually wrapped and stored in air-tight tins.

Sensory evaluation was carried out as follows:

Six volunteers were asked to taste the three samples of chocolate and to score numerically any cooling effect in the mouth (not cooling at all=0, very cooling=5).

The results are
1) Control: 5.
2) Sample 1:1.5.
3) Sample 2:0.

EXAMPLE 5

Compressed tablets in accordance with the present invention was prepared by thoroughly mixing the following ingredients using a Ploughshare mixer, followed by compressing the mixtures into 13 mm diameter tablets using a Manesty F3 single punch tablet machine:

| Ingredient | Control | Sample 1 | Sample 2 |
| --- | --- | --- | --- |
| Sorbitol | 99.0 | 59.4 | 19.7 |
| Amorphous Trehalose | 0.00 | 39.6 | 78.8 |
| Magnesium Stearate | 1.0 | 1.0 | 1.0 |
| Silicon Dioxide | 0 | 0 | 0 |

Sensory evaluation was carried out as follows: eleven volunteers were asked to suck and then crunch the tablets in the mouth and to describe qualitatively any cooling effect in the mouth. The results were as follows:
1) Control: all volunteers reported a cooling sensation.
2) Sample 1: reports varied from very slightly cooling (9 out of 11 volunteers), neutral (1 out of 11 volunteers) and very slightly warming (1 out of 11 volunteers).
3) Sample 2: reports ranged from warming (10 out of 11 volunteers) to neutral (1 out of 11 volunteers).

EXAMPLE 6

A chocolate having an exothermic heat of solution was prepared by a process in accordance with the present invention as described in Example 5. The composition was as follows: amorphous trehalose 47.0%, full cream milk powder 20.5%, cocoa mass 12.5%, cocoa butter 17.5%, butter oil 2.0%, lecithin (TOPCITHIN 200) 0.50% and vanillin crystals 0.30%. The process steps were as described in Example 4.

The above embodiments have been described by way of example only. Many other edible compositions and processes falling within the scope of the present invention will be apparent to the skilled reader.

What is claimed is:

1. An edible composition comprising:
   at least 10% on a dry weight basis of one or more substances having an endothermic heat of solution and soluble in water at 25° C. to the extent of at least 25 grams/liter; and
   at least 10% on a dry weight basis of a substantially amorphous solid trehalose,
   wherein the endothermic heat of solution in water of said one or more substances, when measured at 25° C., is at least as endothermic as −30 kilojoules/kilogram.

2. An edible composition according to claim 1, wherein one or more of said substances having an endothermic heat of solution is substantially crystalline.

3. An edible composition according to claim 1, wherein one or more of said substances having an endothermic heat of solution is substantially anhydrous except for water of crystallisation.

4. An edible composition according to claim 1, wherein one or more of said substances having an endothermic heat of solution is soluble in water at 25° C. to the extent of at least 100 grams/liter.

5. An edible composition according to claim 1, wherein one or more of said substances having an endothermic heat of solution is a soluble pharmaceutical, a pharmaceutically acceptable excipient, a foodstuff, a flavoring, or a dietary supplement.

6. An edible composition according to claim 1, wherein one or more of said substances having an endothermic heat of solution is a sweetener.

7. An edible composition according to claim 6 wherein one or more of said substances having an endothermic heat of solution is selected from the group consisting of crystalline dextrose monohydrate, crystalline trehalose dihydrate and crystalline sugar alcohols.

8. An edible composition according to claim 7, wherein the said one or more substances having an endothermic heat of solution is selected from the group consisting of mannitol, sorbitol, xylitol, maltitol, isomalt, lactitol, and erythritol.

9. An edible composition according to claim 1, wherein one or more of the said substances having an endothermic heat of solution has a heat of solution in water, when measured at 25° C., that is more endothermic than −50 kilojoules/kilogram.

10. An edible composition according to claim 9, wherein one or more of the said substances having an endothermic heat of solution has a heat of solution in water, when measured at 25° C., that is more endothermic than −70 kilojoules/kilogram.

11. An edible composition according to claim 1, comprising at least 20% by weight of one or more substances having a heat of solution in water, when measured at 25° C., that is more endothermic than −30 kilojoules/kilogram.

12. An edible composition according to claim 1, wherein the substantially amorphous solid trehalose has a heat of solution in water, when measured at 25° C., of at least +30 kilojoules/kilogram.

13. An edible composition according to claim 12, wherein the substantially amorphous solid trehalose has a heat of solution in water, when measured at 25° C., of at least +60 kilojoules/kilogram.

14. An edible composition according to claim 1, wherein the edible composition comprises less than 20% by weight of water.

15. An edible composition according to claim 14, wherein the edible composition comprises less than 10% by weight of water.

16. An edible composition according to claim 15, wherein the edible composition comprises less than 5% by weight of water.

17. An edible composition according to claim 1, wherein, the weight ratio of the said one or more substances having an endothermic heat of solution to trehalose is in the range of 1:10 to 3:1.

18. An edible composition according to claim 17, wherein the weight ratio of the said one or more substances having an endothermic heat of solution to trehalose is in the range of from 1:4 to 1:1.

19. An edible composition according to claim 1, wherein the ratio of the said substances having an endothermic heat of solution to trehalose is selected such that the heat of solution of the composition, when measured at 25° C., is less endothermic than −50 kilojoules/kilogram.

20. An edible composition according to claim 19, wherein the ratio of the said substances having an endothermic heat of solution to trehalose is selected such that the heat of solution of the composition, when measured at 25° C., is less endothermic than −30 kilojoules/kilogram.

21. An edible composition according to claim 1, comprising at least 20% by weight amorphous trehalose, calculated on a dry weight basis.

22. An edible composition according to claim 1, wherein said one or more substances having an endothermic heat of solution and said amorphous trehalose together make up at least 25% by weight of the composition, calculated on a dry weight basis.

23. An edible composition according to claim 22, wherein said one or more substances having an endothermic heat of solution and said amorphous trehalose together make up at least 50% by weight of the composition, calculated on a dry weight basis.

24. An edible composition according to claim 23, wherein said one or more substances having an endothermic heat of solution and said amorphous trehalose together make up at least 75% by weight of the composition, calculated on a dry weight basis.

25. An edible composition according to claim 24, wherein said one or more substances having an endothermic heat of solution and said amorphous trehalose together make up at least 90% by weight of the composition, calculated on a dry weight basis.

26. An edible composition according to claim 1, consisting essentially of sugar alcohols and/or sugars having an endothermic heat of solution and the amorphous trehalose.

27. An edible composition according to claim 26, that is a free-flowing, particulate sweetener composition.

28. An edible composition according to claim 1, which is a selected from the group consisting of chocolate, compressed tablets and hard sweets that are sucked in the mouth, and chewing gum.

29. A method of manufacturing an edible composition according to claim 1, comprising the step of dry mixing amorphous trehalose particles in an amount of at least 10% based on the dry weight of the composition with said one or more substances having an endothermic heat of solution, to form a dry mixture.

30. A method according to claim 29, further comprising the step of compressing the dry mixture to form a tablet.

31. A method according to claim 29, wherein the mixture further comprises a fat, and the method further comprises melting the fat in the dry mixture to form a fluid dry mixture.

32. A method according to claim 29, wherein the dry mixture has an exothermic heat of solution in water, when measured at 25° C., of at least +15 kilojoules/kilogram.

33. A method according to claim 29, wherein the edible composition is selected from the group consisting of chocolate, compressed tablets, hard sweets that are sucked in the mouth, and chewing gum.

* * * * *